United States Patent
Venkatesan et al.

(10) Patent No.: US 6,818,348 B1
(45) Date of Patent: Nov. 16, 2004

(54) NICKEL HYDROXIDE PASTE WITH MOLASSES BINDER

(75) Inventors: Srinivasan Venkatesan, Southfield, MI (US); Boyko Aladjov, Rochester Hills, MI (US); Kevin Fok, Troy, MI (US); Thomas Hopper, Clawson, MI (US); Stanford R. Ovshinsky, Bloomfield Hills, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/501,944

(22) Filed: Feb. 10, 2000

(51) Int. Cl.[7] .......................... H01M 4/62; H01M 4/32; H01M 4/52; H01M 4/58
(52) U.S. Cl. ........................................ 429/217; 429/223
(58) Field of Search .................. 429/212, 217, 429/223

(56) References Cited

U.S. PATENT DOCUMENTS

| | | | | |
|---|---|---|---|---|
| 4,015,056 A | * | 3/1977 | Megahed et al. | 429/219 |
| 4,906,539 A | * | 3/1990 | Terasaka et al. | 429/217 |
| 5,077,149 A | * | 12/1991 | Ikoma et al. | 429/101 |
| 5,132,177 A | * | 7/1992 | Kawano et al. | 429/206 |
| 5,707,756 A | * | 1/1998 | Inoue et al. | 429/57 |

FOREIGN PATENT DOCUMENTS

| | | | | |
|---|---|---|---|---|
| JP | 02-244555 | * | 9/1990 | H01M/4/62 |
| JP | 9-120817 | * | 5/1997 | H01M/4/62 |

* cited by examiner

*Primary Examiner*—Patrick Ryan
*Assistant Examiner*—Julian Mercado
(74) *Attorney, Agent, or Firm*—Philip H. Schlazer; Marvin S. Siskind

(57) ABSTRACT

An active electrode composition comprising an active electrode material and a binder where the binder comprises a monosaccharide, a disaccharide, a pectin or a molasses. Preferably, the active electrode material is nickel hydroxide.

6 Claims, No Drawings

NICKEL HYDROXIDE PASTE WITH MOLASSES BINDER

FIELD OF THE INVENTION

The present invention relates to alkaline electrochemical cells. In particular, the present invention relates to active compositions for electrodes of alkaline electrochemical cells.

BACKGROUND OF THE INVENTION

Rechargeable electrochemical cells may be classified as “nonaqueous” cells or “aqueous” cells. An example of a nonaqueous electrochemical cell is a lithium-ion cell which uses intercalation compounds for both anode and cathode, and a liquid organic based or polymer electrolyte. Aqueous electrochemical cells may be classified as either “acidic” or “alkaline”. An example of an acidic electrochemical cell is a lead-acid cell which uses sulfuric acid as the electrolyte, lead dioxide as the active material of the positive electrode, and metallic lead, in a high-surface area porous structure, as the negative active material.

Examples of alkaline electrochemical cells are “nickel-based” alkaline cells. These cells use an alkaline electrolyte (such a potassium hydroxide) and nickel hydroxide as the active material for the positive electrode. Nickel hydroxide has been used for years as an active material for the positive electrode of alkaline batteries. The reactions that take place at the positive electrode of a nickel-based rechargeable electrochemical cell are reversible and include the following chemical reaction:

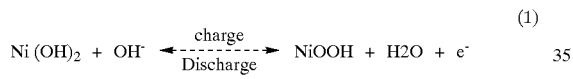

$$Ni(OH)_2 + OH^- \underset{\text{Discharge}}{\overset{\text{charge}}{\longleftrightarrow}} NiOOH + H2O + e^- \quad (1)$$

At the positive electrode, $Ni(OH)_2$ is oxidized to NiOOH during the charge operation. During discharge, the NiOOH is reduced to $Ni(OH)_2$. Examples of such nickel-based alkaline batteries include nickel-metal hydride cells (Ni—MH), nickel cadmium cells (Ni—Cd), and nickel-zinc cells (Ni—Zn). Ni—MH cells used negative electrode using a hydrogen storage alloy as the active material. The hydrogen storage alloy is capable of reversible electrochemical storage of hydrogen.

In general, Ni—MH cells utilize a negative electrode that is capable of reversible electrochemical storage of hydrogen, and a positive electrode of nickel hydroxide material. The negative and positive electrodes are spaced part in the alkaline electrolyte.

Upon application of an electrical potential across a Ni—MH cell, the hydrogen storage alloy of the negative electrode is charged by the electrochemical discharge of hydrogen and the electrochemical generation of hydroxyl ions:

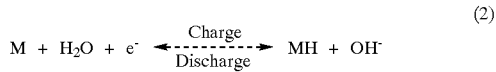

$$M + H_2O + e^- \underset{\text{Discharge}}{\overset{\text{Charge}}{\longleftrightarrow}} MH + OH^- \quad (2)$$

The negative electrode reactions are reversible. Upon discharge, the stored hydrogen is released to form a water molecule and release an electron. (In a Ni—Cd cell, cadmium metal is the active material in the negative electrode).

The active electrode material for both the positive and negative electrodes is usually affixed to a conductive substrate to form the positive and negative battery electrodes. One way to affix the active material to the conductive substrates is to first make the active materials into a paste by adding a small amount of binder and then applying this paste to the substrate. The present invention is directed to a new active material composition including a binder comprising a monosaccharide, a disaccharide, a pectin or a molasses. Electrodes incorporating this active composition have improved electrochemical and mechanical properties.

SUMMARY OF THE INVENTION

An object of the present invention is an electrode and an electrochemical cell having increased power. Another object of the present invention is an electrode and electrochemical cell having ripioved cycle life.

These and other objects of the invention are satisfied by an active composition for an electrode of an alkaline electrochemical cell, comprising: an active electrode material; and a binder comprising a monosaccharide, a disaccharide, a pectin or a molasses.

These and other objects of the invention are also satisfied by an electrode for an alkaline electrochemical cell, comprising: an active composition including: an active electrode material; and a binder comprising a monosaccharide, a disaccharide, a pectin or a molasses.

These and other objects of the invention are also satisfied by an alkaline electrochemical cell, comprising: at least one positive electrode; at least one negative electrode; and an alkaline electrolyte, the positive electrode and/or the negative electrode having an active material composition including a binder comprising a monosaccharide, a disaccharide, a pectin or a molasses.

DETAILED DESCRIPTION OF THE INVENTION

Disclosed herein is an active material composition for use in an electrode of an alkaline electrochemical cell. Generally, the active material composition comprises an active electrode material and a binder. The binder comprises a monosaccharide, a disaccharide, a pectin or a molasses. In addition, the binder may be a mixture of one or more of a monosaccharide, a disaccharide, a pectin or a binder.

Examples of a monosaccharide include glucose, fructose, and galactose. An example of a disaccharide is maltose. An example of a pectin is a fruit pectin such as a citrus fruit pectin and an apple pectin. An example of a molasses is the liquid left after sucrose has been removed from the mother liquid in sugar manufacture.

Generally, the active electrode material may either be a positive electrode material or a negative electrode material. Examples of positive electrode materials include nickel hydroxide, manganese dioxide, zinc oxide, nickel oxide, manganese hydroxide, copper oxide, molybdenum oxide, carbon fluoride, etc. Examples of negative electrode materials include zinc, cadmium hyroxide, hydrogen storage alloys, etc.

Preferably, the active electrode material of the present invention is a nickel hydroxide material. It is within the spirit and scope of this invention that any nickel hydroxide material be used as the active material. Example of nickel hydroxide materials are provided in U.S. Pat. Nos. 5,348,822 and 5,637,423, the contents of which are incorporated by reference herein.

As describhed, the active composition comprises an active electrode material and a binder comprising a monosaccharide, a disaccharide, a pectin or a molasses. Preferably, the binder comprises a pectin or a molasses. In one embodiment of the invention, the binder comprises a pectin. Preferably, the binder consists essentially of a pectin. In another embodiment of the invention, the binder comprises a molasses. Preferably, the binder consists essentially of a molasses.

The binder is preferably intermixed with the active electrode material. More preferably, the binder is intermixed with the active electrode material so as to form a paste. Hence, if the binder is in solid form, it is preferably dissolved in an appropriate solvent before being mixed with the active electrode material. After, the binder is dissolved, the active electrode material is added in order to form an active paste composition.

Preferably, the binder is between about 0.1% and 2.0% by weight of the active material composition. More preferably, the binder is between about 0.2% and about 0.8% by weight of the active material composition. Most preferably, the binder is between about 0.3% and about 0.5% by weight of the active material composition.

An example of an active electrode composition of the present invention comprises about 88.6 wt % nickel hydroxide, about 5 wt % cobalt, about 6 wt % cobalt oxide, and about 0.4 wt % pectin.

Also disclosed herein is an electrode for use in an alkaline electrochemical cell. The electrode comprises the active material composition disclosed above. The active material composition is affixed to a conductive substrate in order to form the electrode. The conductive substrate is used as a support and as a current collector for the active material composition. The electrode is formed by first forming the active composition. Mixing the active material with the binder (in solution) forms a paste which may be applied to the conductive substrate to form an electrode. After the paste is applied to the conductive substrate, the resulting electrode may then be allowed to dry. After the electrode is dried, it may then be compacted so as to obtain the required thickness. Compaction may be accomplished through the use of one or more rolling mills.

The conductive substrate may be any electrically conductive support known in the art capable of holding the active material composition. It is within the spirit and intent of this invention that any and all kinds of electrically conductive substrates may be used. Examples of substrate include foam, perforated metal, expanded metal, screen, matte, and a metal foil. Generally, any metal may be used as long as it is immune from corrosion at the pH and potential of the electrode. Examples of metals include nickel, nickel alloy, nickel plated steel, and nickel plated copper. Substrate for the negative electrode may further include copper or copper alloy. In one embodiment, the substrate is in the form of a metal foam comprising nickel, nickel alloy, nickel-plated steel (i.e., steel which is plated with nickel), or nickel-plated copper (i.e., copper which is plated with nickel). Preferably, the metal foam comprises nickel or a nickel alloy. Other forms of substrate (for example, a nickel foil) may be used to make a thinner electrode. One embodiment of the electrode of the present invention is a nickel hydroxide electrode using an active material composition comprising nickel hydroxide and pectin.

Also disclosed herein is an alkaline electrochemical cell comprising at least one positive electrode, at least one negative electrode, and an alkaline electrolyte. The positive electrodes and/or the negative electrodes may be formed using the active material composition of the present invention. That is, the positive electrodes may be formed using an active positive electrode material and a binder comprising a monosaccharide, a disaccharide, a pectin or a molasses. Also, the negative electrode may be formed using an active negative electrode material and a binder comprising a monosaccharide, a disaccharide, a pectin or a molasses.

For example, a Ni—MH electrochemical cell may be formed by using positive electrodes having an active composition comprising a nickel hydroxide material and pectin. The negative electrodes comprise a hydrogen storage alloy as the active electrode material. Optionally, the negative electrodes may, in addition, have an active composition formed using a hydrogen storage alloy mixed with a pectin binder. Typically, the alkaline electrolyte is an aqueous solution of an alkali metal hydroxide such a potassium hydroxide, lithium hydroxide, sodium hydroxide or mixtures thereof.

The addition of a pectin binder to an active electrode material, such as a nickel hydroxide material, improves the durability and cycle life of the electrode. Specifically, during the charging process of a sealed nickel-metal hydride battery, the positive electrode reaches full charge before the negative and begins to evolve oxygen,

$$2OH^- \longrightarrow H_2O + \tfrac{1}{2}O_2 + 2e^- \qquad (3)$$

The evolved oxygen can oxidize the positive electrode and cause its mechanical disintegration, thereby reducing the electrode's cycle life. In particular, the oxidation can reduce the adhesion and electrical conductivity between the active nickel hydroxide particles and the substrate, thereby increasing the electrode's resistance and reducing the amount of power available for output.

The pectin binder is resistant to oxidation. Hence, while not wishing to be bound by theory, it is believed that the pectin binder protects the electrode from oxidation and deterioration, thereby increasing the integrity and cycle life of the electrode. Furthermore, because it is resistance to oxidation, it is also believed that the pectin binder improves both the particle-to-particle and particle-to-substrate adhesion. The improved adhesion provides for better electrical contact (i.e., improved electrical conductivity) between the active particles and the substrate so as to reduce the internal resistance of the electrode. Hence, less power is wasted due to internal dissipation and more power is available to apply to an external load.

In addition to increasing power, the improved adhesion keeps the active electrode material together thereby reducing the chance that active material particulate may become loose and penetrate one of the separators to cause an electrical short. The improved adhesion also increases the flexibility of the electrode. Hence, the electrodes may be twisted, bent and wound more easily.

The improved adhesion also allows for making thinner electrodes. This may be accomplished by using a thinner substrate, such as a foil substrate, for supporting the active material. Because of the improved adhesion, the active composition remains attached to the thinner substrate. Thinner electrodes may also be made by increasing the amount of force used when compacting the active material onto the substrate. Using thinner electrodes allows for a greater number of electrodes to be placed within the case of the electrochemical cell. This also increases the power of the electrode and cell.

EXAMPLE

A first active positive electrode paste (the "control" material) was prepared using 88.6 wt % Ni(OH)$_2$, 5.0 wt %, Co, 6 wt % CoO and 0.4 wt % PVA binder (polyvinyl alcohol) binder. The paste was affixed to a nickel foam substrate to form a "control" positive electrode.

A second active positive electrode paste was prepared using 88.6 wt % Ni(OH)$_2$, 5.0 wt %, Co, 6 wt % CoO and 0.4 wt % pectin. The pectin is a citrus pectin. The paste was affixed to nickel foam substrates to form "pectin" positive electrodes.

A third active positive electrode paste was prepared using 88.6 wt % Ni(OH)$_2$, 5.0 wt %, Co, 6 wt % CoO and 0.4 wt % molasses. The paste was affixed to nickel foam substrates to form "molasses" positive electrodes.

Using the above identified "control", "pectin" and "molasses" positive electrodes, three nickel metal hydride electrochemical cells were made using negative electrode comprising the same hydrogen storage alloy. All of the cells were cycled (charged/discharged) using the same procedure and the peak power was measured at 50% DOD ("depth of discharge") and at 80% DOD. The results are presented in the Table. The peak power is provided in Watts per kilogram (W/kg).

TABLE

| Peak Power (W/kg) | 50% DOD | 80% DOD |
|---|---|---|
| Control | 254 | 226 |
| Pectin | 274 | 238 |
| Molasses | 286 | 238 |

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:

1. An active composition for a positive electrode of an alkaline electrochemical cell, comprising:
    a nickel hydroxide material; and
    a binder comprising a molasses.

2. The active composition of claim 1, wherein said binder is between about 0.1 and 2.0 weight percent of said active material composition.

3. A positive electrode for an alkaline electrochemical cell, comprising:
    an active composition including:
        a nickel hydroxide material; and
        a binder comprising a molasses.

4. The active composition of claim 3, wherein said binder is between about 0.1 and 2.0 weight percent of said active material composition.

5. An alkaline electrochemical cell, comprising:
    at least one positive electrode;
    at least one negative electrode; and
    an alkaline electrolyte, said positive electrode having an active material composition including a nickel hydroxide material and a binder comprising a molasses.

6. The electrochemical cell of claim 5, wherein said negative electrode comprises a hydrogen storage active material.

* * * * *